(12) United States Patent
Speirs et al.

(10) Patent No.: US 9,799,045 B2
(45) Date of Patent: Oct. 24, 2017

(54) METHOD AND SYSTEM FOR DETERMINING THE VERTICAL ALIGNMENT OF AN INFRASTRUCTURE CORRIDOR

(71) Applicant: Softree Technical Systems Inc., North Vancouver (CA)

(72) Inventors: Craig Speirs, West Vancouver (CA); David Mills, Heriot Bay (CA); Yves Lucet, Coldstream (CA); Warren Hare, Kelowna (CA); Faisal Rahman, Kelowna (CA)

(73) Assignee: SOFTREE TECHNICAL SYSTEMS, INC., North Vancouver, British Columbia (CA)

( * ) Notice: Subject to any disclaimer, the term of this patent is extended or adjusted under 35 U.S.C. 154(b) by 1003 days.

(21) Appl. No.: 13/871,890

(22) Filed: Apr. 26, 2013

(65) Prior Publication Data

US 2013/0290071 A1 Oct. 31, 2013
US 2014/0200966 A2 Jul. 17, 2014
US 2015/0120393 A9 Apr. 30, 2015

Related U.S. Application Data

(60) Provisional application No. 61/639,702, filed on Apr. 27, 2012.

(51) Int. Cl.
*G06Q 30/02* (2012.01)
*G06Q 50/08* (2012.01)

(52) U.S. Cl.
CPC ......... *G06Q 30/0206* (2013.01); *G06Q 50/08* (2013.01)

(58) Field of Classification Search
None
See application file for complete search history.

(56) References Cited

U.S. PATENT DOCUMENTS 5,375,663 A * 12/1994 Teach .................. E02F 3/847
172/4.5
6,996,507 B1 2/2006 Myr
(Continued)

OTHER PUBLICATIONS

US Department of Transportation Federal Highway Adminitration, Office of Planning, Enviornment and Realty. http://www.fhwa.dot.gov/environment/publications/flexibility/ch05.cfm. Updated Sep. 19, 2012.*

(Continued)

*Primary Examiner* — Kibrom K Gebresilassie
*Assistant Examiner* — Herng-Der Day
(74) *Attorney, Agent, or Firm* — Benjamin C. Armitage; Billion & Armitage

(57) ABSTRACT

Methods, systems, and techniques for determining the vertical alignment of an infrastructure corridor having a certain horizontal alignment involve using a processor to model the cost of constructing the infrastructure corridor as a function of cost variables that vary with the vertical alignment of the infrastructure corridor. The processor looks up the cost variables at vertical offsets corresponding to certain vertical alignments of the infrastructure corridor and determines the cost of constructing the length of road at elevations located between pairs of the vertical offsets by interpolating from the cost variables at the vertical offsets; the interpolation may be linear. The processor determines, subject to infrastructure corridor design constraints, the vertical alignment of the infrastructure corridor from the cost of constructing the infrastructure corridor at the vertical offsets.

24 Claims, 9 Drawing Sheets

(56) References Cited

U.S. PATENT DOCUMENTS

| | | | | |
|---|---|---|---|---|
| 7,551,180 | B2* | 6/2009 | Schaffer | G06F 17/5004 345/419 |
| 8,321,181 | B2* | 11/2012 | Detwiler | G06Q 10/04 703/1 |
| 9,127,948 | B2* | 9/2015 | Sandoval | G01C 21/20 |
| 2005/0177381 | A1* | 8/2005 | Parija | G06Q 10/04 703/2 |
| 2006/0034365 | A1* | 2/2006 | Song | H03F 1/3223 375/238 |
| 2006/0206623 | A1 | 9/2006 | Gipps et al. | |
| 2009/0198505 | A1 | 8/2009 | Gipps et al. | |
| 2013/0080124 | A1 | 3/2013 | Koch | |

OTHER PUBLICATIONS

Akay, A.E., "Finding the vertical alignment of forest roads using several heuristic techniques," 2004 Council on Forest Engineering (COFE) Conference Proceedings: "Machines and People, The Interface" (Hot Springs, Apr. 27-30, 2004): 1-5.

Bigdeli et al., "A multi-material mutli-block model for earthwork optimization," Apr. 14, 2011: 1-11.

Goktepe et al., "Dynamic optimization algorithm for vertical alignment of highways," Mathematical and Computational Applications (2005) 10 (3): 341-350.

Hare et al., "Models and algorithsm to improve earthwork operations in road design using mixed integer linear programming," European Journal of Operational Research (2011) 215: 470-480.

Jha et al., "Intelligent Road Design," WIT Press (2006): 35-43.

Kim, E., "A stepwise highway alignment optimization using genetic algorithms," TRB 2003 Annual Meeting (2003): 1-40.

Koch et al., "A note on: Spline technique for modeling roadway profile to minimize earthwork cost," Journal of Industrial and Management Optimization (May 2010) 6 (2): 393-400.

Lee et al., "Optimizing highway grades to minimize cost and maintain traffic speed," Journal of Transportation Engineering (Jul./Aug. 2001) 127 (4): 303-310.

Moreb, A. A., "Linear programming model for finding optimal roadway grades that minimize earthwork cost," Theory and Methodology (1996) 93: 148-154.

Moreb et al., "Quadratic representation for roadway profile that minimizes earthwork cost," Journal of Systems Science and Systems Engineering (2004) 13 (2): 245-252.

Moreb. A. A., "Spline technique for modeling roadway profile to minimize earthwork cost," Journal of Industrial and Management Optimization (2009) 5 (2): 275-283.

Softree, "Information on RoadEngTM Civil Engineering Software," http://web.archive.org/web/20120625050709/http://www.softree.ca/Products/(Civil_RoadEng.aspx (Captured Jun. 25, 2012).

Tunalioğlu et al., "An approach with distance-angle based search algorithm in route design for minimizing earthwork," International Journal of the Physical Sciences (Oct. 9, 2011) 6 (23): 5442-5453.

Wang et al., "Two-stage optimization of highway vertical alignment using genetic algorithms," Computational Modeling and Simulation Group (Sep. 2011): 1-8.

* cited by examiner

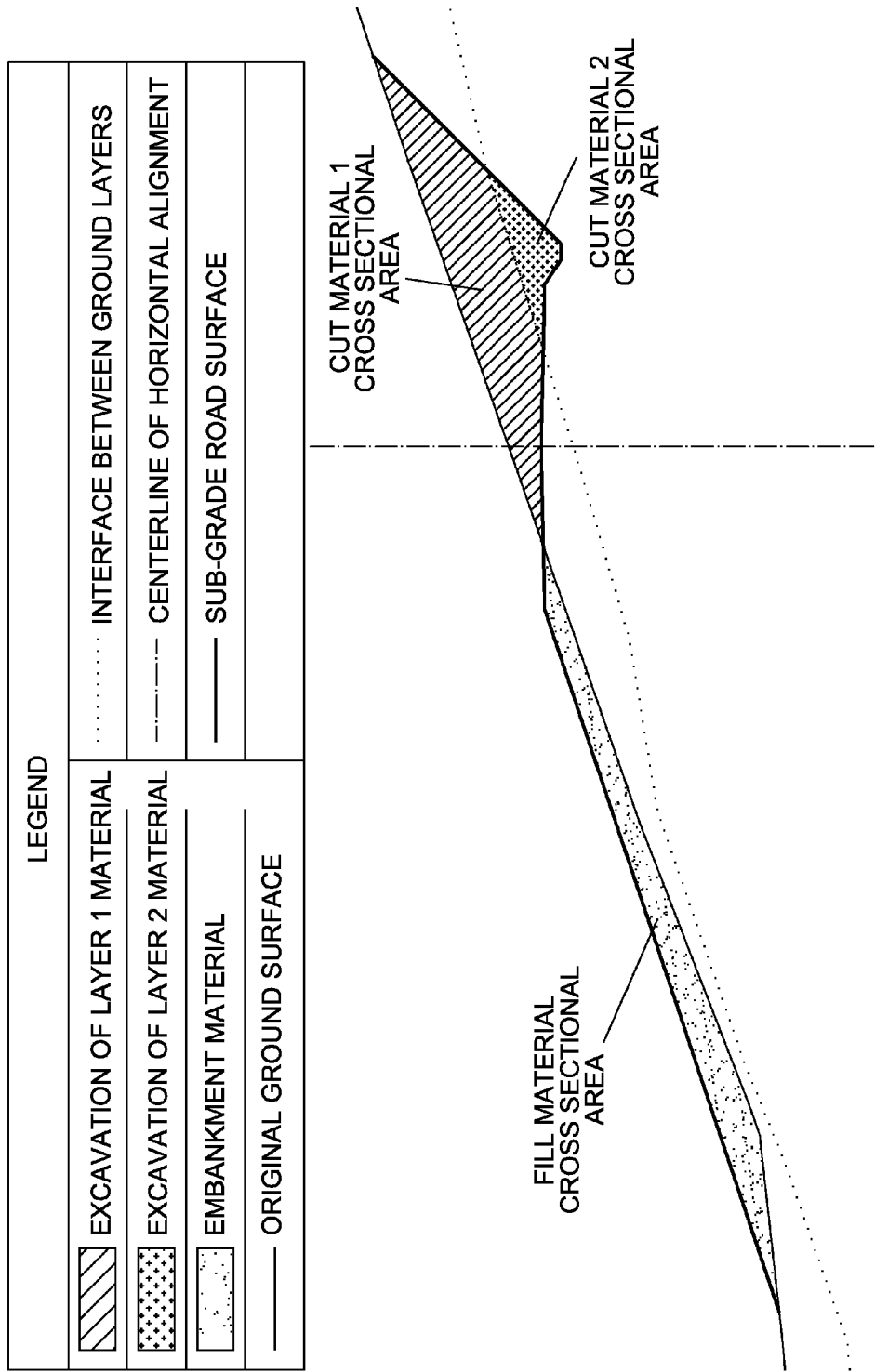

US 9,799,045 B2

METHOD AND SYSTEM FOR DETERMINING THE VERTICAL ALIGNMENT OF AN INFRASTRUCTURE CORRIDOR

TECHNICAL FIELD

The present disclosure is directed at methods, systems, and techniques for determining the vertical alignment of an infrastructure corridor, such as a length of road, having a certain horizontal alignment.

BACKGROUND

Building infrastructure corridors, such as highways and other roads, channels (such as aqueducts), pipelines, and railways, is typically relatively expensive. For example, constructing a highway can cost more than $20,000,000 per kilometer. Earthwork operations, such as excavating, filling, and trucking earth, typically account for roughly 30% of highway construction costs. Given the relative expense of road construction costs, even a seemingly small percentage savings in total construction costs can translate to a relatively high dollar savings. The same is true when constructing many other kinds of infrastructure corridors. Accordingly, research and development continues into methods, systems, and techniques that can be used to more economically and efficiently construct infrastructure corridors, such as highways.

SUMMARY

According to a first aspect, there is provided a method for determining the vertical alignment of an infrastructure corridor having a certain horizontal alignment, the method comprising utilizing a processor to model the cost of constructing the infrastructure corridor as a function of cost variables that vary with the vertical alignment of the infrastructure corridor, wherein the processor looks up the cost variables at vertical offsets corresponding to certain vertical alignments of the infrastructure corridor and determines the cost of constructing the length of road at elevations located between pairs of the vertical offsets by interpolating from the cost variables at the vertical offsets; and determine, subject to infrastructure corridor design constraints, the vertical alignment of the infrastructure corridor from the cost of constructing the infrastructure corridor at the vertical offsets.

The processor may perform linear interpolation.

The processor may utilize a mixed integer linear programming model to determine the vertical alignment of the infrastructure corridor.

The processor may linearly interpolate between two of the vertical offsets that are adjacent to each other.

The infrastructure corridor may comprise a length of road.

The cost variables may be selected from the group consisting of the costs of cutting earth, filling earth, moving earth, and non-volume cost items.

The processor may determine the vertical alignment of the length of road as the vertical alignment that corresponds to the cost variables that minimize the cost of constructing the length of road.

The method may further comprise constructing the infrastructure corridor according to the horizontal alignment and the vertical alignment that the processor determines.

Modeling the cost of constructing the infrastructure corridor may comprise dividing the infrastructure corridor into segments, wherein the vertical offsets for any one of the segments are located on a cross-section at the ends of or within that segment.

The infrastructure corridor may comprise a length of road and the segments may comprise as at least one of standard segments, which do not include any retaining walls or passing lanes, and which are of a substantially constant width; retaining wall segments, which include a retaining wall; passing lane segments, which include a passing lane; and transition segments, which vary in width between one of the passing lane segments and one of the standard segments.

The infrastructure corridor may comprise a length of road and determining the vertical alignment of the road from the cost of constructing the road at the vertical offsets may comprise minimizing an objective function comprising a sum of the costs of cutting earth, filling earth, moving earth, and non-volume cost items.

Determining the cost of constructing the length of road at elevations located between pairs of the vertical offsets by interpolating from the cost variables at the vertical offsets may comprise one of the design constraints, and the other design constraints may comprise as at least one of balance constraints, wherein total cut volume equals total fill volume; offset constraints, wherein the grade of the road is within allowed minimum and maximum grades; smoothness constraints, wherein the vertical alignment of the road is modeled as a smooth spline; fixed point constraints, wherein at least one of the points along the road is predetermined to be at a fixed elevation; and bound constraints, wherein the costs of each of cutting earth, filling earth, moving earth, and non-volume cost items is greater than or equal to zero.

According to another aspect, there is provided a system for determining the vertical alignment of an infrastructure corridor having a certain horizontal alignment, the system comprising a processor; and a non-transitory computer readable medium communicatively coupled to the processor and having encoded thereon statements and instructions to cause the processor to perform a method comprising modeling the cost of constructing the infrastructure corridor as a function of cost variables that vary with the vertical alignment of the infrastructure corridor, wherein the processor looks up the cost variables at vertical offsets corresponding to certain vertical alignments of the infrastructure corridor and determines the cost of constructing the length of road at elevations located between pairs of the vertical offsets by interpolating from the cost variables at the vertical offsets; and determining, subject to infrastructure corridor design constraints, the vertical alignment of the infrastructure corridor from the cost of constructing the infrastructure corridor at the vertical offsets.

The processor may perform linear interpolation.

The processor may utilize a mixed integer linear programming model to model the cost of constructing the length of road.

The processor may linearly interpolate between two of the vertical offsets that are adjacent to each other.

The infrastructure corridor may comprise a length of road.

The cost variables may be selected from the group consisting of the costs of cutting earth, filling earth, moving earth, and non-volume cost items.

The processor may determine the vertical alignment of the length of road as the vertical alignment that corresponds to the cost variables that minimize the cost of constructing the length of road.

The system may further comprise construction equipment for constructing the infrastructure corridor according to the horizontal alignment and the vertical alignment that the processor determines.

Modeling the cost of constructing the infrastructure corridor may comprise dividing the infrastructure corridor into segments, wherein the vertical offsets for any one of the segments are located on a cross-section at the ends of or within that segment.

The infrastructure corridor may comprise a length of road and the segments may comprise as at least one of standard segments, which do not include any retaining walls or passing lanes, and which are of a substantially constant width; retaining wall segments, which include a retaining wall; passing lane segments, which include a passing lane; and transition segments, which vary in width between one of the passing lane segments and one of the standard segments.

The infrastructure corridor may comprise a length of road and determining the vertical alignment of the road from the cost of constructing the road at the vertical offsets may comprise minimizing an objective function comprising a sum of the costs of cutting earth, filling earth, moving earth, and non-volume cost items.

Determining the cost of constructing the length of road at elevations located between pairs of the vertical offsets by interpolating from the cost variables at the vertical offsets may comprise one of the design constraints, and the other infrastructure design constraints may comprise as at least one of balance constraints, wherein total cut volume equals total fill volume; offset constraints, wherein the grade of the road is within allowed minimum and maximum grades; smoothness constraints, wherein the vertical alignment of the road is modeled as a smooth spline; fixed point constraints, wherein at least one of the points along the road is predetermined to be at a fixed elevation; and bound constraints, wherein the costs of each of cutting earth, filling earth, moving earth, and non-volume cost items is greater than or equal to zero.

According to another aspect, there is provided a method for determining the vertical alignment of an infrastructure corridor having a certain horizontal alignment, the method comprising utilizing a processor to look up cost variables that are stored in a non-transitory computer readable medium and that vary with the vertical alignment of the infrastructure corridor, wherein the processor looks up the cost variables at vertical offsets corresponding to certain vertical alignments of the infrastructure corridor; model the cost of constructing the infrastructure corridor as a function of the cost variables, wherein modeling the cost comprises determining the cost of constructing the length of road at elevations located between pairs of the vertical offsets by interpolating from the cost variables at the vertical offsets; determine, subject to infrastructure corridor design constraints, the vertical alignment of the infrastructure corridor as the vertical alignment that results in a substantially minimal cost of constructing the infrastructure corridor; and output the vertical alignment to civil design software.

The processor may perform linear interpolation.

The processor may utilize a mixed integer linear programming model to determine the vertical alignment of the infrastructure corridor.

The processor may linearly interpolate between two of the vertical offsets that are adjacent to each other.

The infrastructure corridor may comprise a length of road.

According to another aspect, there is provided a non-transitory computer readable medium having encoded thereon statements and instructions to cause a processor to perform any aspects of the methods as described above.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more exemplary embodiments:

FIGS. 5(a) through 7(g) show exemplary different treatments of various cross-sections of the length of road, each of which corresponds to a different vertical alignment and cost of constructing the length of road.

FIG. 9 shows one vertical alignment for one cross-section of the length of road in which various cut and fill materials are illustrated, according to another embodiment.

DETAILED DESCRIPTION

Figure 1:
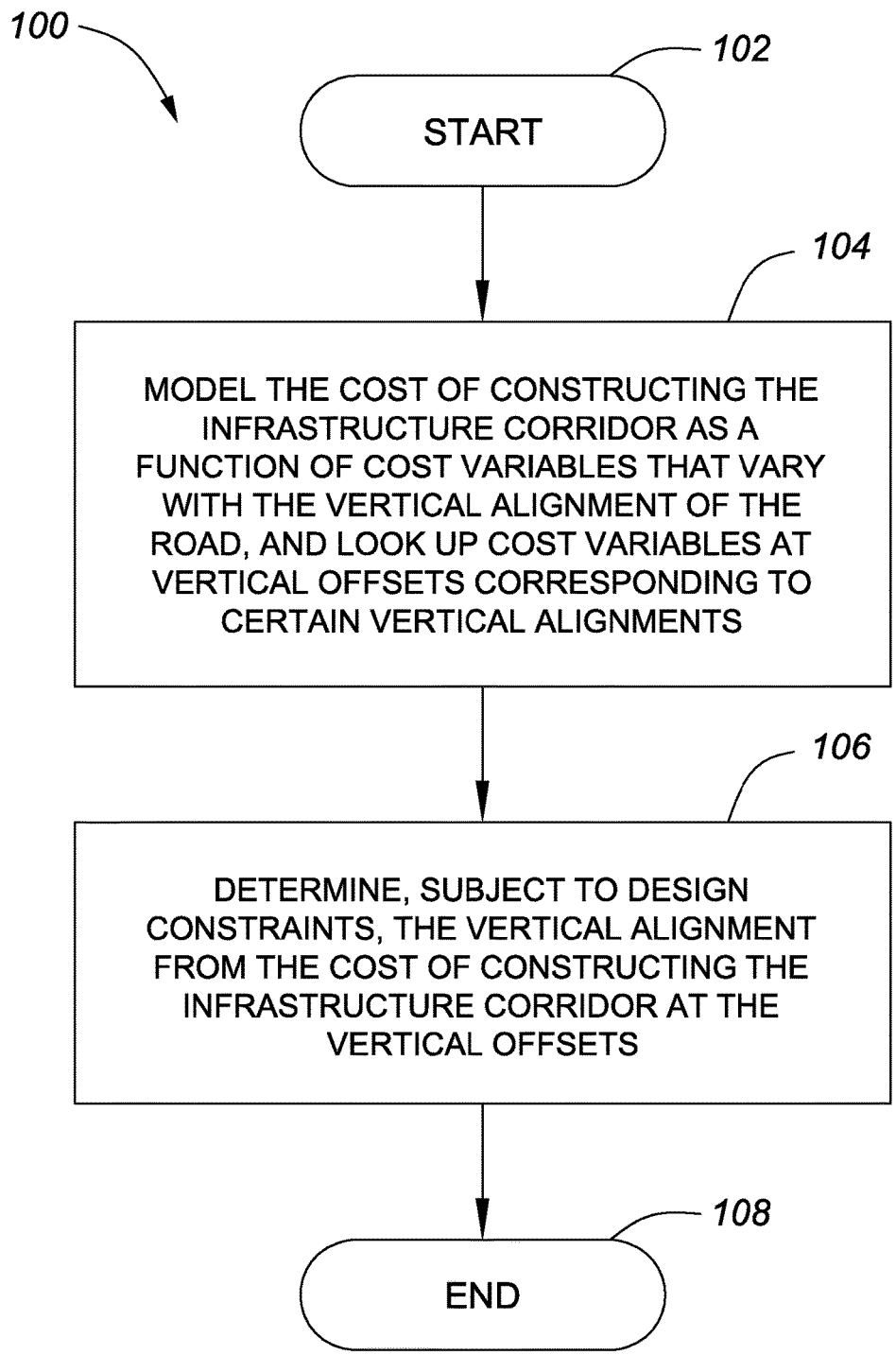
FIG. 1 is a flowchart depicting a method for determining the vertical alignment of an infrastructure corridor having a certain horizontal alignment, according to one embodiment.

Directional terms such as "top," "bottom," "upwards," "downwards," "vertically," and "laterally" are used in the following description for the purpose of providing relative reference only, and are not intended to suggest any limitations on how any article is to be positioned during use, or to be mounted in an assembly or relative to an environment.

Constructing a road typically includes determining the road's horizontal alignment, determining the road's vertical alignment, and determining how to move earth during the cutting and filling that is performed during the road's construction. Horizontal alignment refers to the path the road traces out when seen from a top plan view, while vertical alignment refers to the road's changes in elevation along its length as seen in a profile view of the road (also known as a fence section of the road). Excavation and filling are related to the road's vertical alignment. If a road's vertical alignment requires the road's subgrade to be lower than the land on which the subgrade is to be built, the land is excavated ("cut") and the subgrade is constructed in the resulting channel. In contrast, if a road's vertical alignment requires the road's subgrade to be higher than the land on which the subgrade is to be built, earth is embanked on to the land to "fill" it, and the subgrade is built on the filled land. Earth that is cut from one location along the road's path can be used to fill another location along the road's path. Additionally or alternatively, earth used for filling can be cut from borrow pits, while earth that is cut from the road's path can be disposed of in waste pits.

Several factors related to earth moving can influence the cost of road construction. These include, for example, the type of earth to be cut (e.g.: rock vs. top soil); the distance across which the earth is transported; whether land along the road's path has to be purchased in order to construct the road; the volume of earth that is to be cut and filled; whether structures such as retaining walls are to be built; and the road's length. Minimizing the earth moving costs incurred during road construction can be technically challenging in part because of the sheer number of factors that can influence cost and their variable nature. For example, many of these factors, such as the volume of earth to be cut and filled, whether a retaining wall is needed, and the type of earth to be cut depend on the road's vertical alignment.

The embodiments described in this disclosure are directed at methods, systems, and techniques for determining the vertical alignment of an infrastructure corridor, such as a length of road, given a certain horizontal alignment. An exemplary method and system determine the vertical alignment, subject to certain design constraints discussed in more detail below, by considering which vertical alignment will result in relatively low, and ideally minimized, cost variables. The cost variables in the exemplary embodiments below include, but are not necessarily limited to, earth moving costs. Although the depicted embodiments are directed at determining the vertical alignment of a length of road, in alternative embodiments the vertical alignment of other infrastructure corridors, such as channels (e.g. aqueducts), pipelines, and railways, can be similarly determined.

Referring now to FIG. 1, there is shown one embodiment of a method 100 for determining the vertical alignment of an infrastructure corridor, such as a length of road 218 (not shown in FIG. 1, but shown in FIGS. 2 and 3, and hereinafter referred to simply as the "road 218"), having a certain horizontal alignment. A processor 202 (shown in FIG. 2) performs the method 100. The processor 202 begins performing the method 100 at block 102, and proceeds to block 104 at which the processor 202 models the cost of constructing the road 218 as a function of the cost variables, which vary with the road 218's vertical alignment. The manner in which the processor 202 models the cost of constructing the road 218 is explained with reference to FIGS. 3 to 10.

Figure 3:
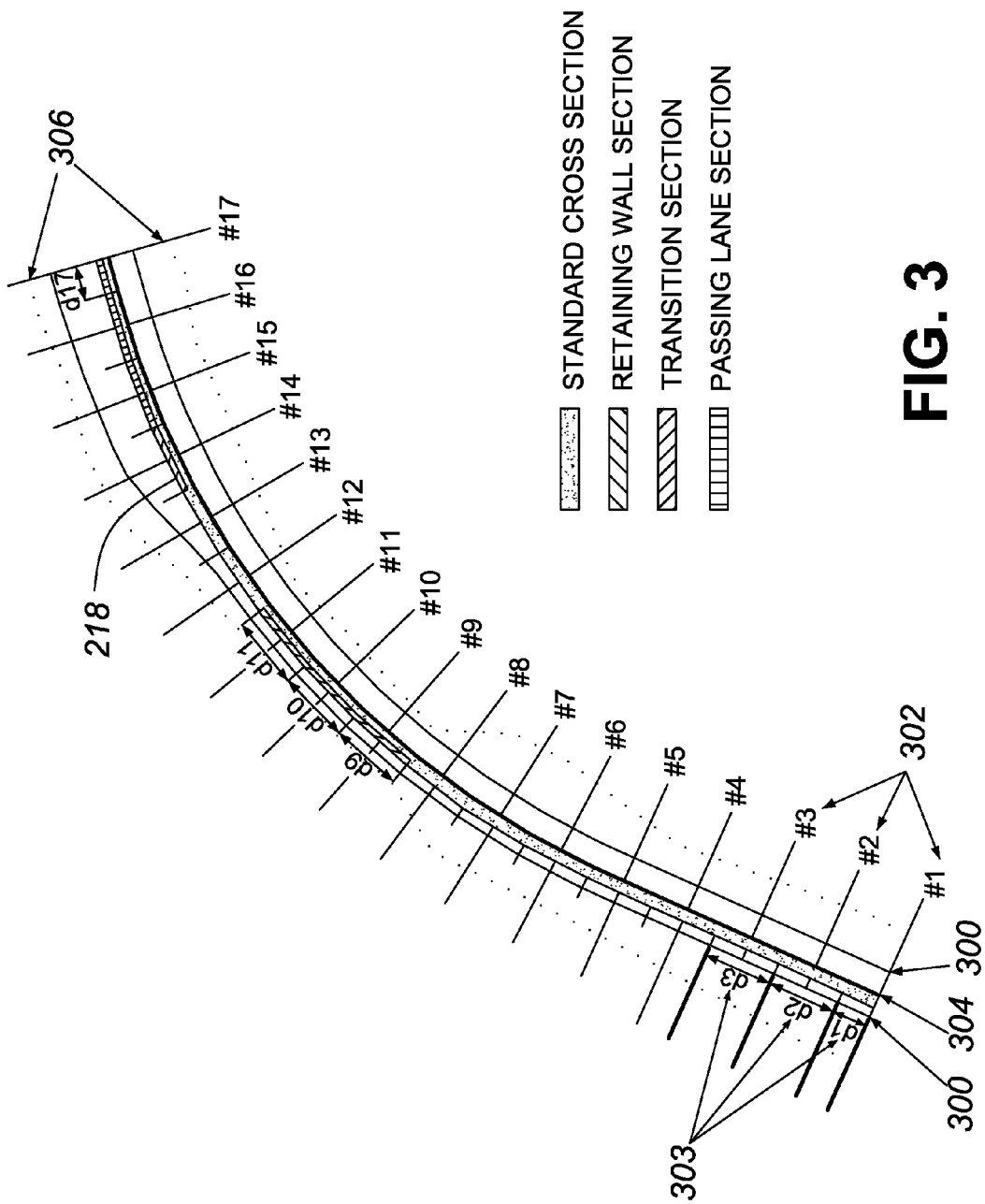
FIG. 3 is an annotated, top plan view of an exemplary, sectioned length of road whose vertical alignment can be determined using the exemplary method and system of FIGS. 1 and 2, respectively.

FIG. 3 shows a top plan view of the road 218 divided into seventeen segments 303 labelled using cross-sections 302 of the segments 303. The cross-sections 302 are labelled #1 through #17, with cross-section #1 corresponding to segment #1, cross-section #2 corresponding to segment #2, and so-on. Cross-sections #2 through #16 are located in the middle of their corresponding segments 303, cross-section #1 is located at the beginning of its corresponding segment 303, and cross-section #17 is located at the end of its corresponding segment 303. Segments #2 through #16 have identical lengths d2 through d16, respectively. Segments #1 and #17 have lengths d1 and d17, respectively, which are half the lengths of segments #2 through #16. The road 218 has a centerline 304 and is bordered by edges 300. The area between the edges 300 represents the paved surface of the road 218. A pair of lines 306 between which the road 218's edges 300 are located represent the edges of the land that is disturbed during road construction. While FIG. 3 shows d2 through d16 being of equal length and d1 and d17 being of equal length, in an alternative embodiment (not depicted) the segments 303 may each be any desired length, whether equal in length to any other segment or not. Additionally, while FIG. 3 depicts the cross-sections 302 being in the middle of their respective segments 303, in an alternative embodiment (not depicted) the cross-sections 302 may be located in any suitable position relative to their respective segments 303, such as at the beginning of the end of the segments 303.

Segments #1 through #8 and #12 are referred to as standard segments 303 of the road 218, which in the depicted embodiment means that these segments 303 of the road 218 do not include any retaining walls, any passing lanes, and are of a substantially constant width. Segments #9 to #11 are referred to as retaining wall segments 303 of the road 218, which means that these segments 303 of the road 218 include a retaining wall to provide structural stability. Segments #15 to #17 are referred to as passing lane segments 303 of the road 218, which means that these segments 303 of the road 218 include a passing lane and are accordingly wider than the standard or retaining wall segments 303. Segments #13 and #14 are referred to as transition segments 303 of the road 218, as they represent a portion of the road 218 that is increasing in width as the road 218 transitions from standard segment #12 to passing lane segment #15. In alternative embodiments (not depicted), other types of segments 303 are possible, and the types of segments 303 depicted in FIG. 3 can be combined. For example, in an alternative embodiment one of the segments 303 of the road 218 may have both a retaining wall and have a passing lane.

Figure 4:
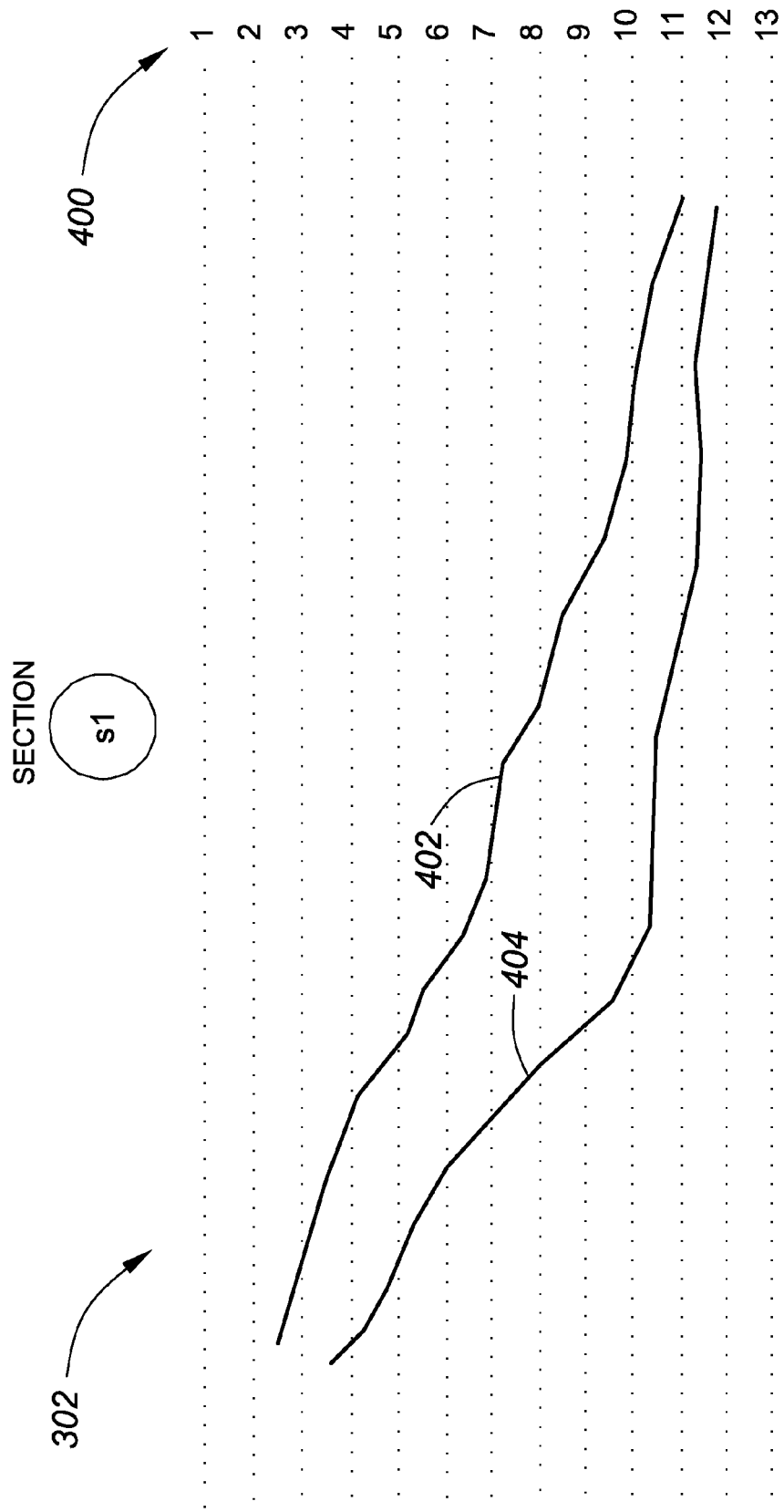
FIG. 4 is a view of one of the sections of the road of FIG. 3, taken along cross-section #1 of FIG. 3 looking towards cross-section #2 of FIG. 3, showing various vertical offsets each of which corresponds to a different vertical alignment of the length of road.
Figure 5:
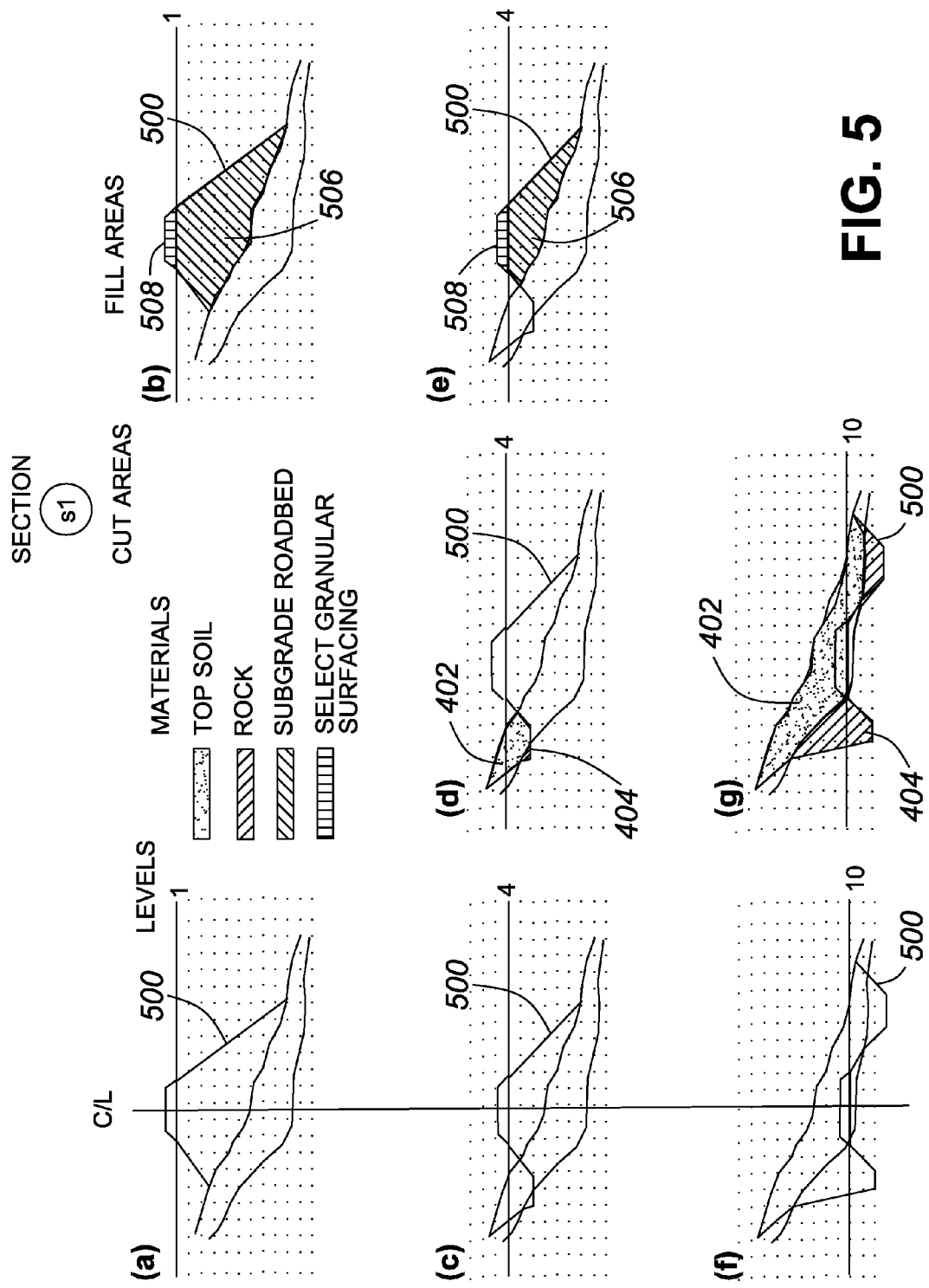
Figure 6:
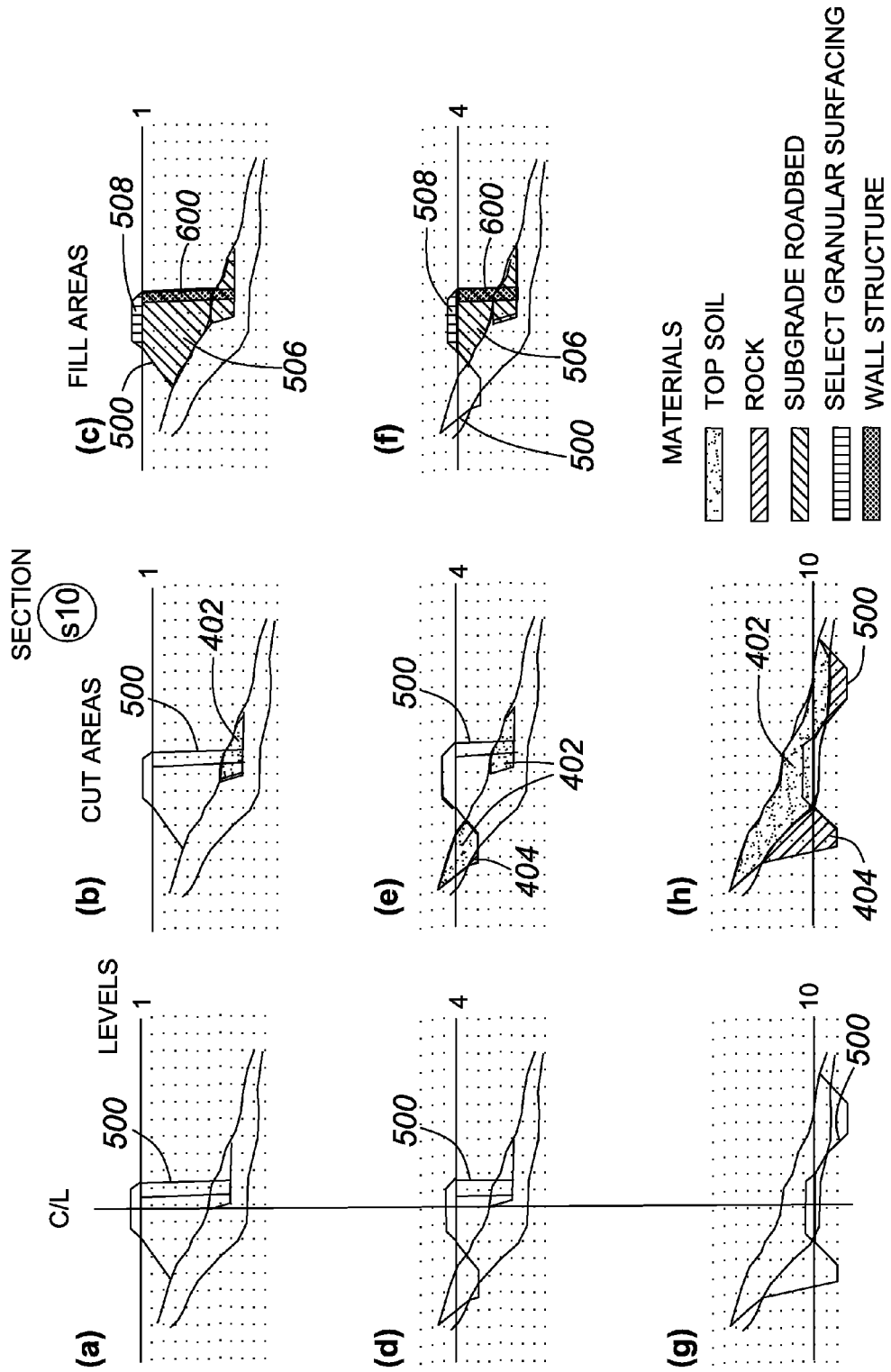
Figure 7:
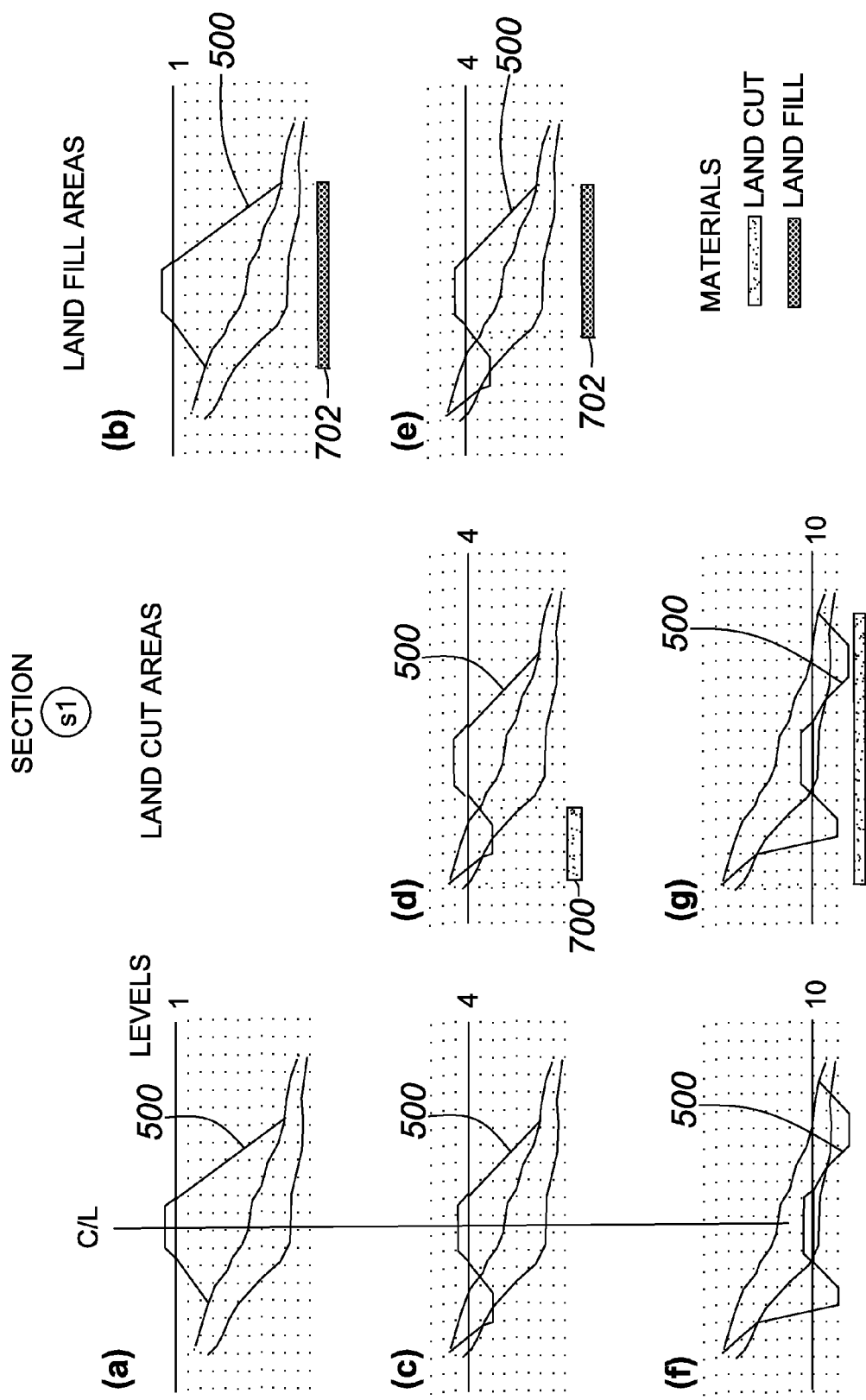

Referring now to FIG. 4, there is shown cross-section #1 of the road 218, looking towards cross-section #2. Cross-section #1 shows an underlying rock layer 404 on which is a layer of relatively soft top soil 402. Cross-section #1 is vertically divided into thirteen different vertical offsets 400, indexed for convenience as #1 to #13, each of which corresponds to a different elevation and to a different vertical alignment of the road 218. For example, the vertical offsets 400 labelled #1, #4, and #10 for cross-section #1 are depicted in FIGS. 5(a)-(g). Each of FIGS. 5(a)-(g) shows a cross-section of a road subgrade 500 calculated from a vertical alignment that corresponds to a road design appropriate for that vertical offset 400. The various road designs are generated using external civil design software 206 (shown in FIG. 2), which is commercially available as any of Roadeng™, Civil 3D™, InRoads™, and GeoPak™ for example. While the step-sizes between vertical offsets 400 in the depicted embodiments are equal, in an alternative embodiment (not depicted) the step-size between the vertical offsets 400 may be different. For example, if a designer determines prior to using the method 100 and system 200 that the vertical alignment is likely to be near a certain elevation, then the step-size near that elevation may be small and may increase as distance from that elevation increases.

FIG. 5(a) shows the subgrade 500 of the road 218 when the vertical alignment is to pass through the topmost of the vertical offsets 400, vertical offset #1. FIG. 5(b) shows that in order to construct the road 218 with this vertical alignment through this cross-section 302, the land under the road 218 is filled with subgrade roadbed 506 up to the subgrade 500 and then the subgrade 500 itself is surfaced using select granular surfacing 508. The type of fill material to use is determined using the external civil design software 206. No land is cut when the vertical alignment passes through vertical offset #1.

FIG. 5(f) shows the subgrade 500 when the vertical alignment is to pass through a lower one of the vertical offsets 400, vertical offset #10. FIG. 5(g) shows that in order to construct the road 218 with this vertical alignment through this cross-section 302, the land is cut. Both the top soil 402 and the rock 404 are cut away. The external civil design software 206 determines what type of and how much land to cut. No land is filled when the vertical alignment passes through vertical offset #10.

FIG. 5(c) shows the subgrade 500 when the vertical alignment is to pass through vertical offset #4. In contrast to vertical offsets #1 and #10 the land is both cut and filled when the vertical alignment passes through vertical offset #4. The top soil 402 and the rock 404 shown in FIG. 5(d) are cut, while the subgrade roadbed 506 and the select granular surfacing 508 used to fill the land are shown in FIG. 5(e).

FIGS. 6(a)-(h) also show vertical offsets #1, #4, and #10 for cross-section #10, which is one of the segments 303 that include a retaining wall 600. FIGS. 6(a), (d), and (g) show the subgrade 500 at vertical offsets #1, #4, and #10, respectively, without shading to indicate what type of land is being cut or filled. FIGS. 6(b), (e), and (h) include shading to show the type and area of land that is cut at vertical offsets #1, #4, and #10, respectively. At vertical offset #1, only some of the top soil 402 is cut; and at vertical offsets #4 and #10, both the top soil 402 and the rock 404 are cut. FIGS. 6(c) and (f) include shading to show the type and area of land that is filled at vertical offsets #1 and #4, respectively. At both of these offsets the subgrade roadbed 506 and select granular surfacing 508 are used to fill just as with section #1, but at both of these vertical offsets 400 the retaining wall 600 is also built to support the road 218. No filling is done at vertical offset #10.

FIGS. 7(a)-(g) again show vertical offsets #1, #4, and #10 for section #1. FIGS. 7(a), (c), and (f) correspond to FIGS. 5(a), (c), and (f). FIGS. 7(d) and (g) show the subgrade 500 at vertical offsets #4 and #10, and the width of land to be cut ("cut land 700") is highlighted. FIGS. 7(b) and (f) show the subgrade 500 at vertical offsets #1 and #4, and the width of land to be filled ("fill land 702").

FIGS. 5(a) through 7(e) identify various cost variables that can influence road construction costs; each of the cost variables varies to a certain degree with vertical alignment. Fill and cut volumes illustrate cost variables that vary with land volume (volumetric costs). The cut land 700 and fill land 702 illustrate cost variables that vary with land area (planimetric costs). Other exemplary costs include the cost of constructing a guard rail, which is a cost that is zero until the vertical alignment is high enough to warrant construction of the guard rail and that varies with guard rail length thereafter, and the cost of rock bolting, which varies with surface area of the rock to be bolted.

The external civil design software 206 determines to what degree each of these various cost variables influences the cost of building the road 218. For each of the cross-sections 302, and each of the vertical offsets 400, the software 206 generates cross-sectional areas, known as "meta-areas". These results are combined into a cost table that relates the cross-section 302, vertical offset 400, and a list of meta-areas, which are proportional to costs; meta-areas and the related meta-volumes are discussed in more detail below. In one embodiment, two kinds of tables are generated from the information generated by the software 206: one table that lists costs only for cutting, and another table that lists costs for filling and for any non-volume cost items, which in the depicted embodiment are the costs of building the retaining wall and for purchasing the cut land 700 and fill land 702. Table 1 is a table that lists costs only for cutting ("cut table"):

TABLE 1

Cut Table

| Station | X | Y | Ground Elevation | Offset | Material Type T1 (Area) | Material Type T2 (Area) | Material Type T3 (Area) | Material Type T4 (Area) | Material Type T5 (Area) |
|---|---|---|---|---|---|---|---|---|---|
| 4725 | 7508.81 | 99119.49 | 812.56 | −10 | 2.92 | 395.22 | 4.68 | 23.56 | 0 |
| 4725 | 7508.81 | 99119.49 | 812.56 | −9 | 2.91 | 339.68 | 4.68 | 22.45 | 0 |
| 4725 | 7508.81 | 99119.49 | 812.56 | −8 | 2.83 | 286.35 | 4.68 | 9.99 | 0 |
| 4725 | 7508.81 | 99119.49 | 812.56 | −7 | 2.75 | 235.96 | 4.68 | 8.77 | 0 |
| 4725 | 7508.81 | 99119.49 | 812.56 | −6 | 2.50 | 190.33 | 4.68 | 6.89 | 0 |
| 4725 | 7508.81 | 99119.49 | 812.56 | −5 | 2.44 | 149.52 | 4.68 | 0 | 0 |
| 4725 | 7508.81 | 99119.49 | 812.56 | −4 | 2.35 | 112.01 | 4.68 | 0 | 0 |
| 4725 | 7508.81 | 99119.49 | 812.56 | −3 | 2.22 | 78.04 | 4.66 | 0 | 0 |
| 4725 | 7508.81 | 99119.49 | 812.56 | −2 | 2.10 | 47.81 | 4.55 | 0 | 0 |
| 4725 | 7508.81 | 99119.49 | 812.56 | −1 | 1.92 | 21.32 | 3.55 | 0 | 0 |
| 4725 | 7508.81 | 99119.49 | 812.56 | 0 | 0 | 0 | 0 | 0 | 0 |

In Table 1, the particular cross-section 302 is identified by the Station, X, and Y columns. The Ground Elevation column represents the elevation of the original ground 402 at a the horizontal alignment center line 304, and the Offset column represents the alignment vertical offsets 400 (indexed differently than shown in FIG. 4) relative to the elevation in the Ground Elevation column. The five columns collectively named Material Type T1-T5 each provides a list of cross-sectional areas taken at the cross-section 302, which are examples of the meta-areas. For example, material type T1 may represent the top soil 402, while material type T2 may represent the rock 404. An entry in the Material Type T1-T5 columns that is 0/m² at a particular one of the vertical offsets 400 represents a material type that is not present at that vertical offset 400. To determine a value directly proportional to the total cost of cutting the land at any one of the vertical offsets 400, the cost to cut the type of land at that offset 400 as represented in the Material Type T1-T5 columns is multiplied by the length of the segment 303 to generate meta-volumes, which corresponds to determining $R^+_{i,m,l}$, as discussed in more detail below.

Table 2 is a table that lists costs for filling and for non-volume cost items ("fill table"):

TABLE 2

Fill Table

| Station | X | Y | Ground Elevation | Offset | Material Type T1 (Area) | Material Type T2 (Area) | Material Type T3 (Area) | Material Type T4 (Area) | Material Type T5 (Area) |
|---|---|---|---|---|---|---|---|---|---|
| 4725 | 7508.81 | 99119.49 | 812.56 | 10 | 0 | −160.97 | 0 | 0 | 0 |
| 4725 | 7508.81 | 99119.49 | 812.56 | 9 | 0 | −144.58 | 0 | 0 | 0 |
| 4725 | 7508.81 | 99119.49 | 812.56 | 8 | 0 | −134.66 | 0 | 0 | 0 |
| 4725 | 7508.81 | 99119.49 | 812.56 | 7 | 0 | −102.59 | 0 | 0 | 0 |
| 4725 | 7508.81 | 99119.49 | 812.56 | 6 | 0 | −94.55 | 0 | 0 | 0 |
| 4725 | 7508.81 | 99119.49 | 812.56 | 5 | 0 | −88.89 | 0 | 0 | 0 |
| 4725 | 7508.81 | 99119.49 | 812.56 | 4 | 0 | −67.81 | 0 | 0 | 0 |
| 4725 | 7508.81 | 99119.49 | 812.56 | 3 | 0 | −54.66 | 0 | 0 | 0 |
| 4725 | 7508.81 | 99119.49 | 812.56 | 2 | 0 | −39.41 | 0 | 0 | 0 |
| 4725 | 7508.81 | 99119.49 | 812.56 | 1 | 0 | −3.64 | 0 | 0 | 0 |
| 4725 | 7508.81 | 99119.49 | 812.56 | 0 | 0 | 0 | 0 | 0 | 0 |

In Table 2, the particular cross-section 302 is identified by the Station, X, and Y columns. The Ground Elevation column represents the elevation of the ground 402 at the horizontal alignment center line 304, and the Offset column represents the vertical offsets 400 (indexed differently than shown in FIG. 4) relative to the elevation in the Ground Elevation column. The five columns collectively named Material Type T1-T5 each provides a list cross-sectional areas taken at the cross-section 302 and are examples of meta-areas. For example, material type T2 may represent the cost of filling using the subgrade roadbed 506. An entry in the Material Type T1-T5 columns that is 0/m² at a particular one of the vertical offsets 400 represents a material type that is not used for filling at that vertical offset 400. To determine a value whose magnitude is directly proportional to the total cost of filling the land at any one of the vertical offsets 400, the value per unit area at that offset 400 as represented in the Material Type T1-T5 columns is multiplied by the length of the segment 303 to generate meta-volumes, which corresponds mathematically to determining $R^-_{i,m,l}$, as discussed in more detail below.

Although no non-volume cost items are present in the embodiment of the fill table above, other embodiments of the fill table may include these items. For example, in an embodiment in which the fill table includes the cost of purchasing the cut land 700 and fill land 702, the total cost of purchasing the land 700,702 for one of the cross-sections 302 can be expressed as a cost of purchasing the land 700,702 in $/m for each of the vertical offsets 400 by using the known width of that cross section 302 at those vertical offsets 400. Similarly, in an embodiment in which the retaining wall 600 is to be built for one of the segments 303, the cost of building the retaining wall 600 can be expressed in $/m for each of the vertical offsets 400 by using the known height of the retaining wall 600 at those vertical offsets 400.

Figure 8:
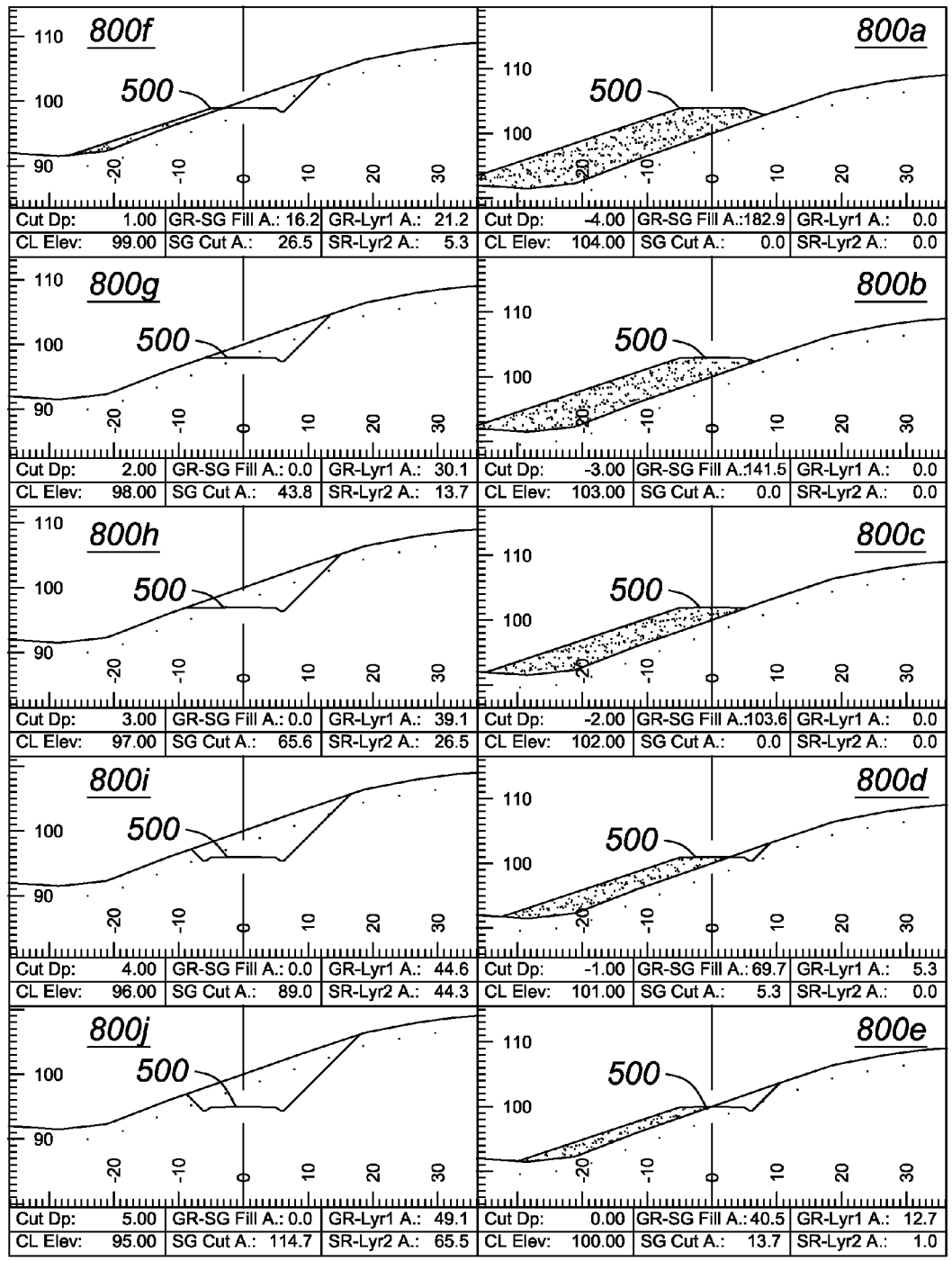
FIGS. 8(a)-(j) show ten different vertical alignments for one cross-section of the length of road, according to another embodiment.

Referring now to FIG. 8, there are shown ten views 800a-j (hereinafter collectively "views 800") of the vertical alignment at ten different vertical offsets 400 for one of the cross-sections 302 of the road, according to another embodiment. A first view 800a in the top right of FIG. 8 shows the subgrade 500 at the highest of the ten vertical offsets 400; in this view, the subgrade 500 at this cross-section 302 is constructed entirely through filling. As the views 800 progress from the first view 800a to a last view 800j in the bottom left of FIG. 8, the subgrade 500 decreases in elevation, with each subsequent one of the views 800 corresponding to a lower one of the vertical offsets 400. In the last view 800j, the subgrade 500 is constructed entirely through cutting. In some intermediate views 800d-f, the subgrade 500 is constructed through both cutting and filling.

Table 3 below is a table corresponding to FIG. 8 that shows both cut and fill costs for the various views 800.

TABLE 3

Cost Table for both Cut and Fill Costs

| Station | X | Y | Ground Elev. | Offset | A1 | Type 1 | A2 | Type 2 | A4 | Type 4 |
|---|---|---|---|---|---|---|---|---|---|---|
| 0 | 0 | 0 | 100 | −5 | 49.14 | GR | 65.52 | SR | 0.00 | GR |
| 0 | 0 | 0 | 100 | −4 | 44.65 | GR | 44.32 | SR | 0.00 | GR |
| 0 | 0 | 0 | 100 | −3 | 39.08 | GR | 26.49 | SR | 0.00 | GR |
| 0 | 0 | 0 | 100 | −2 | 30.12 | GR | 13.70 | SR | 0.00 | GR |
| 0 | 0 | 0 | 100 | −1 | 21.22 | GR | 5.27 | SR | −16.18 | GR |
| 0 | 0 | 0 | 100 | 0 | 12.66 | GR | 1.04 | SR | −40.47 | GR |
| 0 | 0 | 0 | 100 | 1 | 5.27 | GR | 0.00 | SR | −69.71 | GR |
| 0 | 0 | 0 | 100 | 2 | 0.00 | GR | 0.00 | SR | −103.63 | GR |
| 0 | 0 | 0 | 100 | 3 | 0.00 | GR | 0.00 | SR | −141.54 | GR |
| 0 | 0 | 0 | 100 | 4 | 0.00 | GR | 0.00 | SR | −182.90 | GR |
| 0 | 0 | 0 | 100 | 5 | 0.00 | GR | 0.00 | SR | −227.91 | GR |

The Station, X, Y, Ground Elevation, and Offset columns are analogous to those of Tables 1 and 2, above, with the offsets 400 again being numbered differently than in FIG. 4. In contrast to Tables 1 and 2 in which cut and fill costs are segregated by table, Table 3 combines cut costs (columns "A1", "Type 1", "A2", and "Type 2") and fill costs (columns "A4" and "Type 4") together in one table. Table 3 also expressly identifies what type of material is being used to cut or fill land in the "Type" columns: "GR" represents gravel, while "SR" represents the rock 404. FIG. 3 also shows that cut and fill costs can be non-zero at the same vertical offset 400. Alternative embodiments of Table 3 may also include non-volume cost items.

FIG. 9 shows a cross-section 302 of the road 218, in a style similar to the views 800 of FIG. 8, in which two different types of material are cut from the earth, and one type of material is used to fill the earth.

Regardless of the embodiment of the cost table used, the processor 202 looks up the cost variables in the cost tables when determining the cost of constructing the road 218 at the vertical alignments that correspond to the vertical offsets 400. Looking up the cost variables that the external civil design software 206 has pre-determined allows the processor 202 to relatively quickly and efficiently perform calculations related to determining the cost of constructing the road 218 at the vertical alignments that correspond to the vertical offsets 400.

Given the cost variables at the vertical offsets 400, which the processor 202 looks up using the cost tables in a way that uses relatively minimal processor resources, the processor 202 is able to determine the vertical alignment for the road 218 as follows.

The processor 202 utilizes the following variables:
(a) K is the index set of possible types of material that can be cut or filled, which are referred to as Material Types T1-T5 in Tables 1 and 2 and Types 1,2, and 4 in Table 3: $K=\{1, \ldots, \overline{m}\}$.
(b) S is the index set of the possible cross-sections: $S=\{1, 2 \ldots n\}$. In the embodiment of FIG. 3, n=18.
(c) B is the index set of all borrow pits.
(d) W is the index set of all waste pits.
(e) $s_i$ with i∈S is the distance of the $i^{th}$ cross-section from the beginning of the road 218.
(f) G is the index set of all quadratic spline segments, $G=\{1, 2, 3 \ldots \overline{g}\}$. As discussed in more detail below, in the depicted embodiments a quadratic spline is used to model the vertical alignment of the road 218.
(g) $S_g$ is the index set of $n_g$ cross-sections 302 in the $g^{th}$ spline segment. $S_g=\{1, 2 \ldots n_g\}$ and $n=\Sigma_{g \in G} n_g$ is the total number of cross-sections 302 indexed by the set S. That is, where one of the spline segments spans multiple cross-sections, $n_g$ is the number of cross-sections 302 included in the $g^{th}$ spline segment.
(h) $F: G \times S_g \to S$ is the function which maps the cross-section index in the $g^{th}$ spline segment to the cross-section 302 as indexed from the beginning of the road 218. For example, if $F(g,j)=i$ then $s_i=s_{F(g,j)}$ (for all $g \in G, j \in S_g$, i∈S). $s_1=s_{F(1,1)}$ and $s_{n(\overline{g},n_{\overline{g}})}$.

For each i∈S∪B∪W the index set $\mathcal{N}_{\to}^i$ consists of all indices j such that $x_{ijm}$ is a permitted move; that is, a move in which it is reasonable to move material m from cross-section i to cross-section j:

$$\mathcal{N}_{\to}^i = \begin{cases} j \in S \cup W & \text{if } i \in S \\ j: j \in S & \text{if } i \in B \\ \phi & \text{if } i \in W \end{cases}$$

Similarly, for each i∈S∪B∪W the index set $\mathcal{N}_{\leftarrow}^i$ consists of all indices j such that $x_{jim}$ is a permitted move:

$$\mathcal{N}_{\leftarrow}^i = \begin{cases} j \in S \cup B & \text{if } i \in S \\ j: \phi & \text{if } i \in B \\ j \in S & \text{if } i \in W \end{cases}$$

Note that $j \in \mathcal{N}_{\to}^i$ if, and only if, $i \in \mathcal{N}_{\leftarrow}^j$. $\mathcal{N}^2$ consists of all index pairs (i,j) such that $x_{jim}$ is a permitted move: $\mathcal{N}^2=\{(i,j): j \in \mathcal{N}_{\to}^i\}$.

In this embodiment, the profile of the road 218 is represented by a quadratic spline, which is a piecewise quadratic function, having $\overline{g}$ segments indexed by the set $G=\{1, 2, 3 \ldots \overline{g}\}$. For all g∈G, the equation for each of the segments 303 is $$P_g(s) = a_{g,1} + a_{g,2}s + a_{g,3}s^2,$$

where s is the distance to the cross-section 302 in question along the centerline 304.

Using the notation $P'_g(s)$ to denote the derivative $$P'_g(s) = a_{g,2} + 2a_{g,3}s,$$

the spline as P is defined as $$P(s) = \begin{cases} P_1(s) & \text{if } s_{F(1,1)} \le s \le s_{F(1,n_1)}, \\ P_2(s) & \text{if } s_{F(2,1)} \le s \le s_{F(2,n_2)}, \\ \vdots \\ P_{\overline{g}}(s) & \text{if } s_{F(\overline{g},1)} \le s \le s_{F(1,n_{\overline{g}})}. \end{cases}$$

In an alternative embodiment (not depicted), the vertical alignment may be represented by linear tangents connected by parabolic vertical curves. In another alternative embodiment (not depicted), a piece-wise linear vertical alignment or any other representation of a continuous road surface is used.

A meta-material refers to a physical material (such as gravel, the top soil 402, or the rock 404) or a non-volume cost item associated with building the road 218 at one of the vertical offsets 400. A meta-volume is a number that is directly proportional to the cost of incorporating the meta-material into the road 218. For example, referring to Table 3, a meta-volume results from multiplying one of the meta-areas by the length of the segment 303 for that meta-area. For a cost item that depends on volume, such as the cost of filling using gravel, meta-volume is the actual volume of the material to be cut, filled, or transported; this volume is then multiplied by the cost per unit volume to cut, fill, or transport the material to determine the total cost of cutting, filling, or transporting this material, respectively. For a non-volume cost item, meta-area is a number generated that, when multiplied by the length of the segment 303, results in the total cost of incorporating the non-volume cost item into the road 218. For example, the meta-area of the retaining wall 600 is the average cost per unit length of the segment 303 of road 218 to construct the wall 600. The terms "meta-area" and "meta-volume" are used for non-volume cost items as the processor 202 when looking up values in the cut and fill tables does not distinguish between volume cost items and non-volume cost items; indeed, generating a meta-volume regardless of whether a cost item depends on volume or not allows the processor 202 to treat all such costs identically, thereby simplifying processing.

The input parameters the processor 202 uses follow.
(a) $h_i$ (for all i∈S) is the elevation of the ground at cross-section i.
(b) $L_{i,l}^+$ is the vertical offset 400 from ground (usually negative) of cut level $l \in \{1, \ldots, l_i^+\}$ at cross-section i.
(c) $L_{i,l}^-$ is the vertical offset 400 from ground of fill level $l \in \{1, \ldots, l_i^-\}$ at cross-section i.
(d) $d_i$ with i∈S is the effective length of the $i^{th}$ segment 303. d1 through d17 in FIG. 3 are examples of $d_i$.

(e) $A_{i,m,l}^+$ is the meta-area of meta-material m ($\in K$) that is excavated if the vertical alignment is at level l ($1 \leq l \leq \bar{l}_i^+$) at section i ($\in S$). This corresponds to the areas listed in Table 1, and to the areas that correspond to cutting earth in Table 3.

(f) $A_{i,m,l}^-$ is the meta-area of meta-material m ($\in K$) that is applied if the vertical alignment is at level l ($1 \leq l \leq \bar{l}_i^-$) at section i ($\in S$). This corresponds to the areas listed in Table 2, and to the areas that correspond to filling earth in Table 3.

(g) $R_{i,m,l}^+ = d_i A_{i,m,l}^+$ is the meta-volume of meta-material m ($\in K$) to be excavated if the vertical alignment is at level l ($1 \leq l \leq \bar{l}_i^+$) at cross-section i ($\in S$). This is typically zero for any meta-material m representing a non-volume cost item.

(h) $R_{i,m,l}^- = d_i A_{i,m,l}^-$ is the meta-volume of meta-material m ($\in K$) to be embanked if the alignment is at level l ($1 \leq l \leq \bar{l}_i^-$) at cross-section i ($\in S$).

(i) $p_m$ is the excavation cost per meta-volume of meta-material m ($\in K$).

(j) $q_m$ is the embankment cost per meta-volume of meta-material m ($\in K$).

(k) $c_m$ is the hauling cost per meta-volume of meta-material m ($\in K$). This is typically zero for any meta-material m representing a non-volume cost item.

(l) L (resp. U) is the lower (resp. upper) bound of the grade of the road 218 profile.

(m) $y_A$ (resp. $y_B$) is the starting (resp. ending) elevation of the road 218 profile.

(n) $\bar{y}_A$ (resp. $\bar{y}_B$) is the starting (resp. ending) grade of the road 218 profile.

(o) $H_i$ (for all $i \in H$) is the elevation of the control point, discussed in more detail below in respect of fixed point constraints, for cross-section $i \in S$. The index set of such control points is denoted by H and may be empty.

The decision variables the processor 202 uses follow:

(a) $V_{i,m}^+$ (for all $i \in S \cup B$ and $m \in K$) is the meta-volume of material m excavated, or cut, at cross-section i.

(b) $V_{i,m}^-$ (for all $i \in S \cup W$) is the meta-volume of material m embanked, or filled, at cross-section i.

(c) $x_{ij,m}$ (for all $(i,j) \in \mathcal{N}^2, m \in K$) is the volume of material m moved from cross-section i to cross-section j.

(d) $u_1$ (for all $i \in S$) is the difference in elevation between the road 218 profile and the ground profile at cross-section i.

(e) $a_{g,k}$ (for all $g \in G, k \in \{1,2,3\}$) is the $k^{th}$ coefficient of the quadratic polynomial that defines the spline on the $g^{th}$ segment of the road 218 profile.

The Objective Function

The objective of the processor 202 is to determine the vertical alignment that corresponds to minimal total costs for the excavation, embankment and other costs for all the segments 303 including earth movement to and from borrow and waste pits and to minimize total hauling cost for moving materials between the segments. Given the cost variables at the vertical offsets 400, which the processor 202 can look-up using the cost tables in a way that uses relatively minimal processor resources, and the costs at the elevations that the processor 202 determines using linear interpolation as discussed in more detail below in respect of volume constraints, the processor 202 is able to determine the vertical alignment for the road 218 by modeling the cost of constructing the road 218 as the following optimization problem:

$$\min \sum_{\substack{i \in S \cup B \\ m \in K}} p_m V_{i,m}^+ + \sum_{\substack{i \in S \cup W \\ m \in K}} q_m V_{i,m}^- + \sum_{\substack{(i,j) \in \mathcal{N}^2 \\ m \in K}} c_m x_{ij,m} \quad (1)$$

The leftmost term in Equation (1) represents the total cut (excavation) costs of constructing the road 218; the middle term represents the total fill (embankment) costs of constructing the road 218, and of any non-volume cost items; and the rightmost term represents the total earth moving costs of constructing the road 218. Equation (1) can be solved using a variety of mathematical techniques; in the present embodiment, the processor 202 utilizes mixed integer linear programming techniques, as discussed in more detail below.

The processor 202 determines the vertical alignment of the road 218 subject to the following design constraints.

Balance Constraints

The balance constraints are that total cut volume equals total fill volume; i.e., that the processor 202 accounts for all of the earth that is cut or filled.

$\sum_{j \in N_\rightarrow} {}^i x_{ij,m} = V_{i,m}^+$, for all $i \in S \cup B, m \in K$ $\sum_{j \in N_\leftarrow} {}^i x_{ji,m} = V_{i,m}^-$, for all $i \in S \cup W, m \in K$ Volume Constraints In addition to looking up the cost variables at the vertical offsets 400, the processor 202 may also linearly interpolate from the vertical offsets 400 the cost of constructing the road 218 at elevations between the offsets 400. This allows the processor 202 not only to determine which of the discrete vertical offsets 400 corresponds to the minimal cost of constructing the road 218, but what the minimal cost of constructing the road 218 along a continuous range of elevations that each corresponds to a different vertical alignment of the road 218.

$$V_{i,m}^+ = R_{i,m,l}^+ + \frac{R_{i,m,l+1}^+ - R_{i,m,l}^+}{L_{i,l+1}^+ - L_{i,l}^+} (u_i - L_{i,l}^+),$$

for all $i \in S$, $m \in K$, where $1 \leq l \leq \bar{l}_i^+$ and $L_{i,l}^+ \leq u_i \leq L_{i,l+1}^+$ $$V_{i,m}^- = -R_{i,m,l}^- - \frac{R_{i,m,l+1}^- - R_{i,m,l}^-}{L_{i,l+1}^- - L_{i,l}^-} (u_i - L_{i,l}^-),$$

for all $i \in S$, $m \in K$, where $1 \leq l \leq \bar{l}_i^-$ and $L_{i,l}^- \leq u_i \leq L_{i,l+1}^-$ These equations utilize linear interpolation to calculate meta-areas and meta-volumes at locations between the vertical offsets 400, thereby allowing the vertical alignment to be determined not only at the vertical offsets 400 themselves. The resulting cost function is piece-wise linear; this is beneficial in that it is a relatively efficient manner of allowing the processor 202 to model the cost of constructing the road 218 and it can be used in a mixed integer linear programming model. While less accurate, a step function can also be used to represent costs. Other embodiments, that do not use linear programming, may use second or higher order polynomials to interpolate between levels.

The input data that the processor 202 uses is assumed to satisfy the following conditions:

$$L_{i,l}^+ < L_{i,l+1}^+ \text{ for } 1 \leq l \leq \bar{l}_i^+, i \in S, m \in K,$$

$$L_{i,l}^- < L_{i,l+1}^- \text{ for } 1 \leq l \leq \bar{l}_i^-, i \in S, m \in K,$$

In other words, the vertical offsets are not out of order.

Offset Constraints

The decision variable $u_i$ represents the difference between the road 218 profile (represented by the quadratic spline $P(s_i)$) and the ground profile ($h_i$).

$$P(s_i) - h_i = u_i, \text{ for all } i \in S.$$

The grades defined by the spline are within the allowed maximum and minimum grades as dictated by, for example, local legislation:

$$L \leq P'(s_i) \leq U, \text{ for all } i \in S.$$

Smoothness Constraints

The transition from one spline segment to the next is smooth. In the present embodiment, "smooth" means that two spline segments define portions of the road 218 having identical grades at the point at which they connect.

$$P_{g-1}(s_{F(g,1)}) = P_g(s_{F(g,1)}),$$

$$P'_{g-1}(s_{F(g,1)}) = P'_g(s_{F(g,1)}),$$

for all $g = 2, \ldots, \bar{g}-1$.

Fixed Point Constraints

The fixed point constraints define one or both of the start and end elevation and grade of the road 218 (start=A and end=B), as well as a list of control points (H), which represent places along the road where elevation is fixed.

$$P(s_1) = y_A,$$

$$P'(s_1) = \bar{y}_A,$$

$$P(s_n) = y_B,$$

$$P'(s_n) = \bar{y}_B,$$

$$P(s_i) = H_i, \text{ for all } i \in H.$$

Bound Constraints

The processor 202 uses the following bound constraints:

$$x_{i,j,m} \geq 0, \text{ for all } (i,j) \in \mathcal{N}^2, m \in K,$$

$$V_{i,m}^+ \geq 0, \text{ for all } i \in S \cup B, m \in K,$$

$$V_{i,m}^- \geq 0, \text{ for all } i \in S \cup W, m \in K.$$

While in the present embodiment all of the above constraints are employed when solving Equation (1), in alternative embodiments only a subset of the constraints may be used, or other constraints may be used. For example, in an alternative embodiment (not depicted), while the volume and smoothness constraints are used, the fixed point constraints are not.

Once the processor 202 has modeled the cost of constructing the road 218 as described above, it proceeds from block 104 to block 106 and, subject to the above design constraints, incorporates an optimization solver (such as COIN-OR CBC, CPLEX™ or Gurobi) to solve Equation (1). Input to the processor 202 prior to solving Equation (1) are the horizontal alignment of the road 218; one or more topographic surfaces representing the ground and optionally sub-surface layers, such as the rock 404; the design constraints; cross-section information for each of the segments 303; material movements costs; cost tables for all of the cross-sections 302; and the location and capacity of borrow and waste pits.

From this, the processor 202 outputs the vertical alignment of the road 218 that corresponds to a desired, and minimal, cost of constructing the road 218, and a description of a desired way of moving materials, which may correspond the minimal cost way of transporting materials. In alternative embodiments, the processor 202 may select a non-minimal solution. Once the processor 202 solves Equation (1), it proceeds to block 108 and the method 100 ends.

Figure 2:
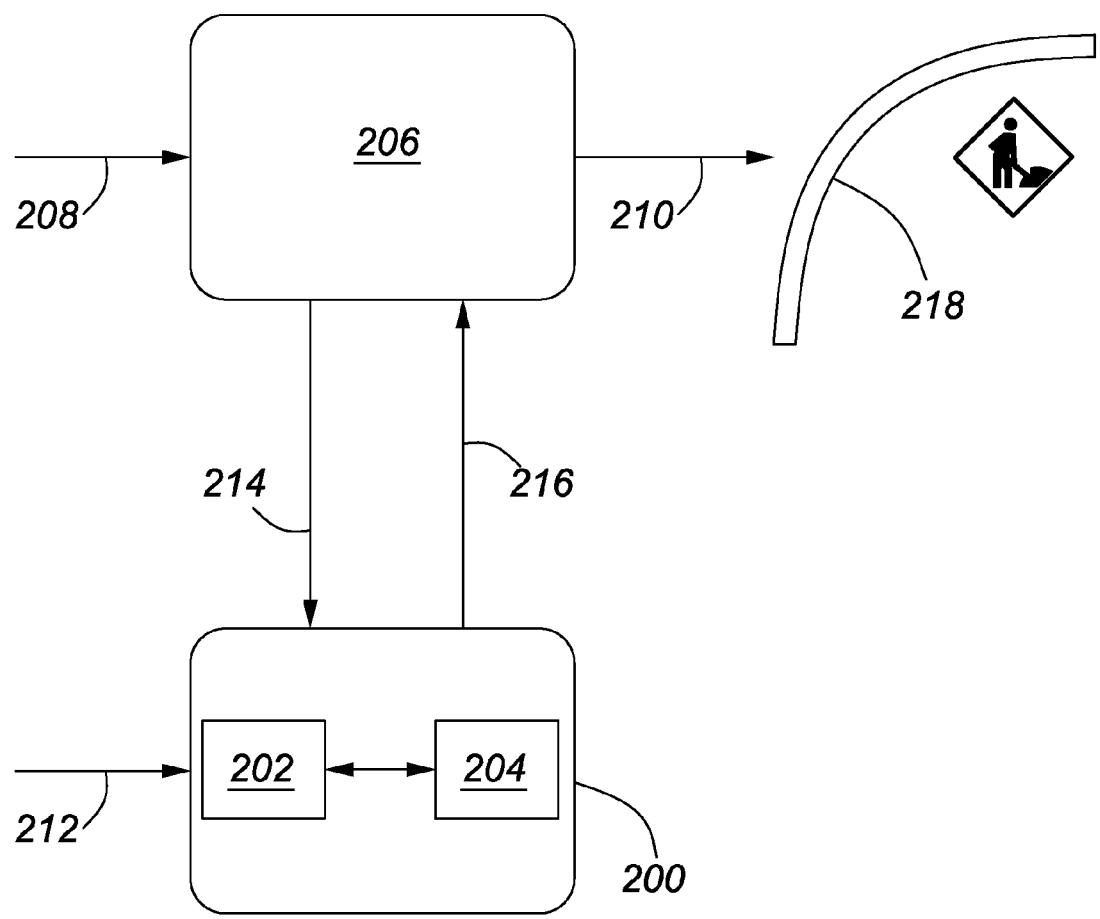
FIG. 2 depicts a system for determining the vertical alignment of a length of an infrastructure corridor having a certain horizontal alignment, according to another embodiment.

Referring now to FIG. 2, there is shown a system 200 for determining the minimal vertical alignment of the road 218. The system 200 includes the processor 202, which is communicatively coupled to a computer readable medium 204 that has encoded on it the method 100. The processor 202 may be any suitable type of processor, such as a programmable logic controller, microprocessor, microcontroller, application specific integrated circuit, field programmable gate array, multi-core processor, an assembly of processors configured to execute code in parallel, or the like. The computer readable medium 204 is non-transitory and may, for example, be any suitable type of semiconductor or disc based memory, such as RAM (whether volatile or non-volatile), ROM, hard disk drives, CD-ROMs, and DVD-ROMs.

As discussed above, the system is communicatively coupled to the external civil design software 206. A user inputs to the external civil design software 206 information 208 such as the road 218's horizontal alignment, topographical information, and design parameters such as cross section prescriptions along the length of the road including cut and fill slopes, curve super-elevation, retaining wall or other structure locations, passing lanes and other locations where the road is relatively wide, and guard rails. A user directly supplies the system 200 with information 212 such as cost parameters and the design constraints; exemplary cost parameters are the cost per cubic meter of excavation (cutting) or embankment (filling) and the cost per cubic meter per kilometre of transporting earth. The external civil design software 206 supplies the system 200 with information 214 relating to the cross-sections 302 and the cost tables. The system 200 performs the method 100 and outputs information 216 in the form of the vertical alignment of the road 218 to the external civil design software 206. The external civil design software 206 then outputs to the user road design documentation 210, from which the road 218 may be constructed.

For the sake of convenience, the example embodiments above are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. For example, in alternative embodiments the segments 303 may be of varying lengths. As another example, while particular embodiments described in the foregoing produce minimal cost vertical alignment solutions, it is possible to generate a substantially minimal, but nonetheless non-minimal, solution that meets all constraints, by terminating operations of the processor 200 prior to its determining the minimal solution. This is of value when the minimal solution takes an extremely long time to compute. The quality of this solution can be quantified by determining an "optimality gap". A lower bound for the minimal cost can be determined by relaxing a subset of design constraints and solving the resulting simpler optimization problem. The percentage difference between the cost of any non-minimal solution and this lower bound is the optimality gap; i.e., the optimality gap is an upper bound on the cost difference between a non-minimal solution and the minimal cost solution. In a mixed integer linear programming embodiment, the volume constraints described above contain integer variables (the choice of an interval). If these integer constraints are relaxed, the problem reduces to a pure linear programming model. The minimal cost solution to this simpler linear programming model provides the lower bound for the optimality gap. It will be clear to any person skilled in the art that modifications of and adjustments to the foregoing embodiments, not shown, are possible.

The invention claimed is:

1. A method for determining a vertical alignment of an infrastructure corridor, the infrastructure corridor having a certain horizontal alignment and being divided into two or more segments each having a length, the method comprising utilizing a processor to:
   (a) model, for each segment, a cost of constructing the segment as a function of pre-determined cost variables that vary with vertical offsets of a vertical cross-section of the segment, wherein:
      (i) each vertical offset corresponds to a certain vertical alignment of the infrastructure corridor;
      (ii) each cost variable represents a cost per unit length of constructing the segment; and
      (iii) the processor looks up the pre-determined cost variables;
   (b) multiply, after looking up the pre-determined cost variables, each pre-determined cost variable by the length of the segment, wherein the processor further determines the cost of constructing the segment at intermediate elevations between pairs of adjacent vertical offsets by interpolating from the pre-determined cost variables at the pairs of adjacent vertical offsets, each of the intermediate elevations located between a corresponding one of the pairs of adjacent vertical offsets, and wherein each intermediate elevation corresponds to a certain vertical alignment of the infrastructure corridor; and
   (c) determine, subject to infrastructure corridor design constraints, the vertical alignment of the infrastructure corridor from the cost of constructing each segment at the vertical offsets and at the intermediate elevations, wherein determining the vertical alignment of the infrastructure corridor comprises minimizing a cost of constructing the infrastructure corridor, and wherein the cost of constructing the infrastructure corridor comprises a sum of the costs of constructing the two or more segments for any given vertical offset and for any given intermediate elevation;
wherein the method further comprises constructing the infrastructure corridor according to the horizontal alignment and the vertical alignment that the processor determined.

2. The method as claimed in claim 1 wherein the processor determines the cost of constructing each segment at the intermediate elevations by linearly interpolating from the pre-determined cost variables at the pairs of adjacent vertical offsets corresponding to the intermediate elevations.

3. The method as claimed in claim 2 wherein the processor utilizes a mixed integer linear programming model to determine the vertical alignment of the infrastructure corridor.

4. The method as claimed in claim 3 wherein the infrastructure corridor comprises a length of road.

5. The method as claimed in claim 4 wherein the pre-determined cost variables are selected from the group consisting of the costs of: cutting earth, filling earth, moving earth, and non-volume cost items.

6. The method as claimed in claim 5 wherein minimizing the cost of constructing the infrastructure corridor comprises minimizing an objective function comprising a sum of the costs of cutting earth, filling earth, moving earth, and non-volume cost items of each segment.

7. The method as claimed in claim 1 wherein, for each segment, the vertical cross-section is located at the ends of or within the segment.

8. The method as claimed in claim 7 wherein the infrastructure corridor comprises a length of road and wherein the two or more segments comprise at least one of:
   (a) standard segments, which do not include any retaining walls or passing lanes, and which are of a substantially constant width;
   (b) retaining wall segments, which include a retaining wall;
   (c) passing lane segments, which include a passing lane; and
   (d) transition segments, which vary in width between one of the passing lane segments and one of the standard segments.

9. The method as claimed in claim 7 wherein the design constraints comprise at least one of:
   (a) balance constraints, wherein total cut volume equals total fill volume;
   (b) offset constraints, wherein a grade of the road is within allowed minimum and maximum grades;
   (c) smoothness constraints, wherein the vertical alignment of the infrastructure corridor is modeled as a smooth spline;
   (d) fixed point constraints, wherein a fixed point comprises a point along the infrastructure corridor that is predetermined to be at a fixed elevation; and
   (e) bound constraints, wherein each pre-determined cost variable is greater than or equal to zero.

10. The method of claim 1, further comprising utilizing a processor to:
   (e) output the vertical alignment to civil design software.

11. The method of claim 1, wherein the processor looks up the pre-determined cost variables in one or more cost tables, the one or more cost tables comprising entries representing the pre-determined costs variables further as a function of one or more of: horizontal position of the infrastructure corridor; ground elevation; an amount of a type of material to be cut; an amount of a type of material for filling; and an amount of a non-volume cost item.

12. The method of claim 1, wherein the pre-determined cost variables are pre-determined by an external civil design software.

13. A non-transitory computer readable medium having encoded thereon statements and instructions to cause a processor to perform a method as claimed in claim 1.

14. A system for determining a vertical alignment of an infrastructure corridor, the infrastructure corridor having a certain horizontal alignment and being divided into two or more segments each having a length, the system comprising:
   (a) a processor; and
   (b) a non-transitory computer readable medium communicatively coupled to the processor and having encoded thereon statements and instructions to cause the processor to perform a method comprising:
      (i) modeling, for each segment, a cost of constructing the segment as a function of pre-determined cost variables that vary with vertical offsets of a vertical cross-section of the segment, wherein:
         (1) each vertical offset corresponds to a certain vertical alignment of the infrastructure corridor;
         (2) each cost variable represents a cost per unit length of constructing the segment; and
         (3) the processor looks up the pre-determined cost variables;
      (ii) multiplying, after looking up the pre-determined cost variables, each pre-determined cost variable by the length of the segment, wherein the processor further determines the cost of constructing the segment at intermediate elevations between pairs of adjacent vertical offsets by interpolating from the pre-determined cost variables at the pairs of adjacent vertical offsets, each of the intermediate elevations located between a corresponding one of the pairs of adjacent vertical offsets, and wherein each intermediate elevation corresponds to a certain vertical alignment of the infrastructure corridor; and
      (iii) determining, subject to infrastructure corridor design constraints, the vertical alignment of the infrastructure corridor from the cost of constructing each segment at the vertical offsets and at the intermediate elevations, wherein determining the vertical alignment of the infrastructure corridor comprises minimizing a cost of constructing the infrastructure corridor, and wherein the cost of constructing the infrastructure corridor comprises a sum of the costs of constructing the two or more segments for any given vertical offset and for any given intermediate elevation;
   (c) construction equipment for constructing the infrastructure corridor according to the horizontal alignment and the vertical alignment that the processor determined.

15. The system as claimed in claim 14, wherein the processor determines the cost of constructing each segment at the intermediate elevations by linearly interpolating from the pre-determined cost variables at the pairs of adjacent vertical offsets corresponding to the intermediate elevations.

16. The system as claimed in claim 15 wherein the processor utilizes a mixed integer linear programming model to model the cost of constructing the infrastructure corridor.

17. The system as claimed in claim 16 wherein the infrastructure corridor comprises a length of road.

18. The system as claimed in claim 17 wherein pre-determined cost variables are selected from the group consisting of the costs of: cutting earth, filling earth, moving earth, and non-volume cost items.

19. The system as claimed in claim 18 wherein minimizing the cost of constructing the infrastructure corridor comprises minimizing an objective function comprising a sum of the costs of cutting earth, filling earth, moving earth, and non-volume cost items of each segment.

20. The system as claimed in claim 14 wherein, for each segment, the vertical cross-section is located at the ends of or within the segment.

21. The system as claimed in claim 20 wherein the infrastructure corridor comprises a length of road and wherein the two or more segments comprise as at least one of:
   (a) standard segments, which do not include any retaining walls or passing lanes, and which are of a substantially constant width;
   (b) retaining wall segments, which include a retaining wall;
   (c) passing lane segments, which include a passing lane; and
   (d) transition segments, which vary in width between one of the passing lane segments and one of the standard segments.

22. The system as claimed in claim 20 wherein the infrastructure design constraints comprise at least one of:
   (a) balance constraints, wherein total cut volume equals total fill volume;
   (b) offset constraints, wherein a grade of the infrastructure corridor is within allowed minimum and maximum grades;
   (c) smoothness constraints, wherein the vertical alignment of the infrastructure corridor is modeled as a smooth spline;
   (d) fixed point constraints, wherein a fixed point comprises a point along the infrastructure corridor that is predetermined to be at a fixed elevation; and
   (e) bound constraints, wherein each pre-determined cost variable is greater than or equal to zero.

23. The system of claim 14, wherein the processor further looks up the pre-determined cost variables in one or more cost tables, the one or more cost tables comprising entries representing the pre-determined costs variables further as a function of one or more of: horizontal position of the infrastructure corridor; ground elevation; an amount of a type of material to be cut; an amount of a type of material for filling; and an amount of a non-volume cost item.

24. The system of claim 14, wherein the pre-determined cost variables are pre-determined by an external civil design software.

* * * * *